United States Patent [19]
Loy

[11] 3,974,409
[45] Aug. 10, 1976

[54] COIL END-TURN SUPPORT STRUCTURE FOR LARGE DYNAMOELECTRIC MACHINES

[75] Inventor: Robert E. Loy, Columbus, Ohio

[73] Assignee: McGraw-Edison Company, Elgin, Ill.

[22] Filed: Jan. 30, 1975

[21] Appl. No.: 545,418

[52] U.S. Cl. ............................... 310/260; 310/270
[51] Int. Cl.² ......................................... H02K 3/46
[58] Field of Search ................... 310/260, 270, 194

[56] References Cited
UNITED STATES PATENTS

| | | | |
|---|---|---|---|
| 1,122,187 | 12/1974 | Behrend | 310/260 |
| 3,089,048 | 5/1963 | Bahn et al. | 310/260 |
| 3,866,073 | 2/1975 | Gjaja | 310/260 |

FOREIGN PATENTS OR APPLICATIONS

| | | | |
|---|---|---|---|
| 1,021,407 | 3/1966 | United Kingdom | 310/270 |

*Primary Examiner*—Donovan F. Duggan
*Attorney, Agent, or Firm*—Jon Carl Gealow

[57] ABSTRACT

A coil end-turn support structure for large dynamoelectric machines including a plurality of bracket assemblies which support the coil end-turn windings in a fixed position with respect to the main body of the machine in all directions except the axial direction. Ball bearings are captivated in slots in the bracket assemblies so as to provide free and smooth movement of the end-turns in the axial directions while providing rigid support of the end-turns in all other directions.

8 Claims, 9 Drawing Figures

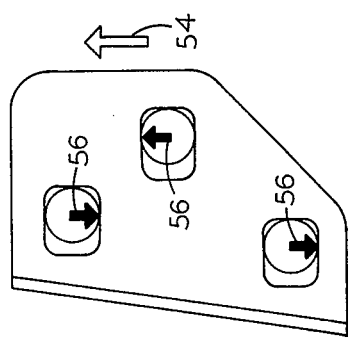
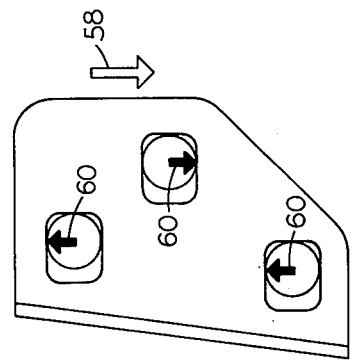
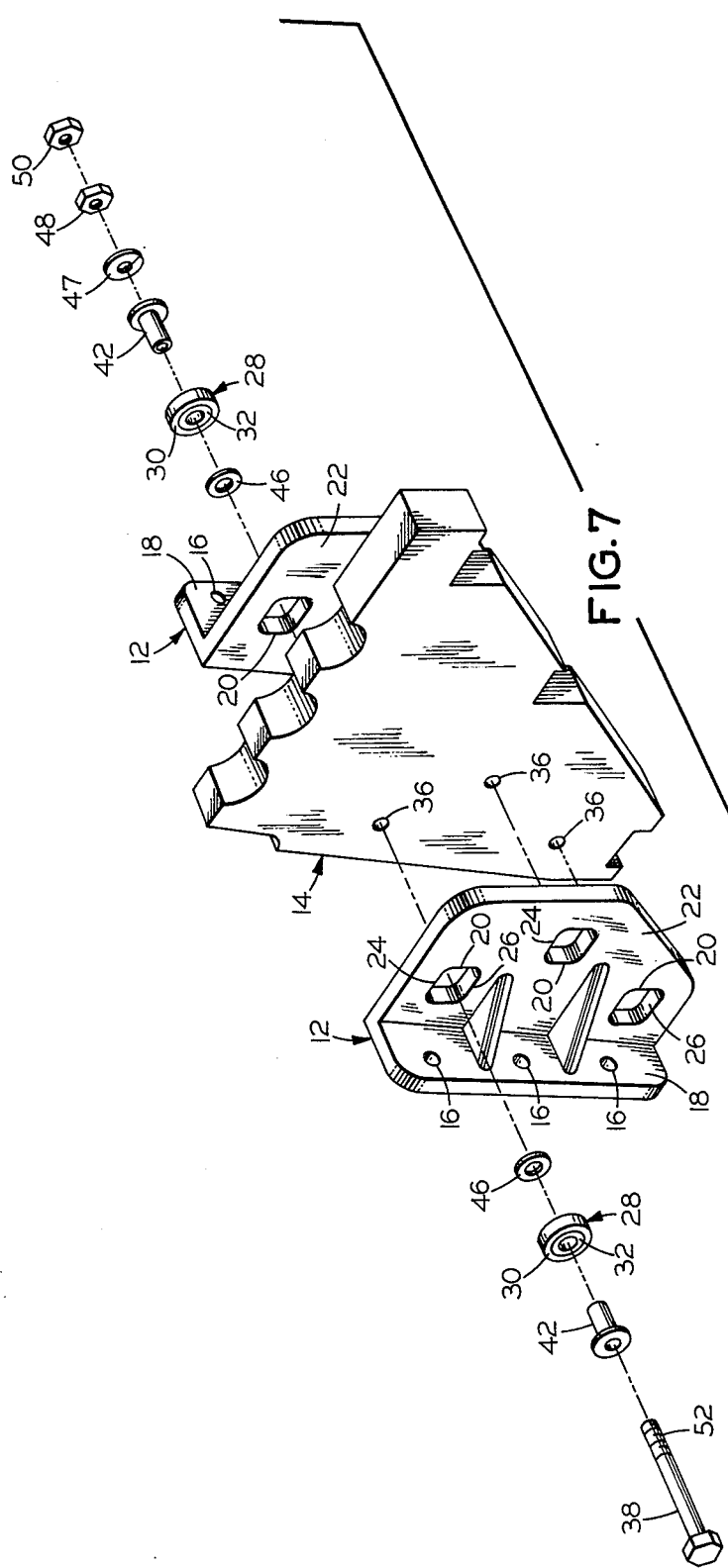

COIL END-TURN SUPPORT STRUCTURE FOR LARGE DYNAMOELECTRIC MACHINES

BACKGROUND OF THE INVENTION

As the axial length of large dynamoelectric machines is increased and as they operate at increasingly high temperatures, with increased temperature differences from the ambient, thermal expansion of the long coils becomes an increasingly severe problem. If means are not provided to permit axial expansion of the coils, large forces and resulting stresses will be created in the coils which may damage the machine. It has thus been found desirable to provide an arrangement for supporting the coil end-turns whereby free movement in the axial direction is permitted, while movement in all directions is restrained. A Winding Support System For A Dynamoelectric Machine is revealed in U.S. Pat. No. 3,089,048-Bahn et al which provides for axial movement of coil end-turns by captivating the ends of a pin in a slot between friction-reducing bearing pads.

It is an object of this invention to provide an improved coil end-turn support structure for large dynamoelectric machines which is simpler and less costly, and at the same time more rugged and compact.

It is a further object of this invention to assemble the coil end-turn support structure from readily available components.

SUMMARY OF THE INVENTION

The foregoing objects are accomplished in accordance with this invention in one form thereof by providing two first support members or brackets which are secured in a spaced relationship to the stator or main body of the dynamoelectric machine and receive therebetween and support a second support member or plate secured to the stator coil end-turns. A plurality of elongated slots are provided in the brackets for receiving the outer races of ball bearing assemblies. The slots are slightly wider than the outer diameter of the ball bearings so as to permit the outer races of the bearings to roll instead of sliding in the slots. The slots are elongated in the axial direction so as to permit the required axial movement. Apertures are provided in the second support member or plate in alignment with the bore in the inner race of the ball bearing, to receive a cylindrical member which passes through the bore in the inner race of the bearings and fastening means are provided on the cylindrical member to secure the inner races of the ball bearings to the second support member.

BRIEF DESCRIPTION OF THE DRAWINGS

FIG. 7 is an exploded perspective view of the coil end-turn support arrangements of this invention;

FIG. 8 is a side elevation view showing the direction of forces on the bearing structures resulting from an externally supplied force;

FIG. 9 is similar to FIG. 8 with forces shown in the opposite direction.

DESCRIPTION OF THE PREFERRED EMBODIMENT

Figure 1:
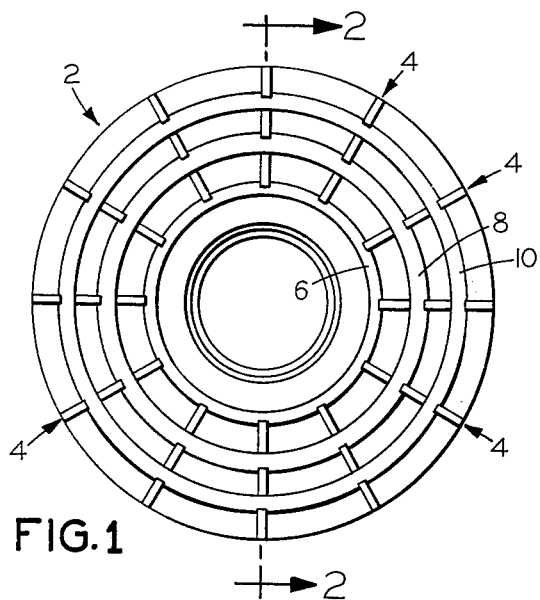
FIG. 1 is an end view of a dynamoelectric machine provided with the coil end-turn support structure of this invention.
Figure 2:
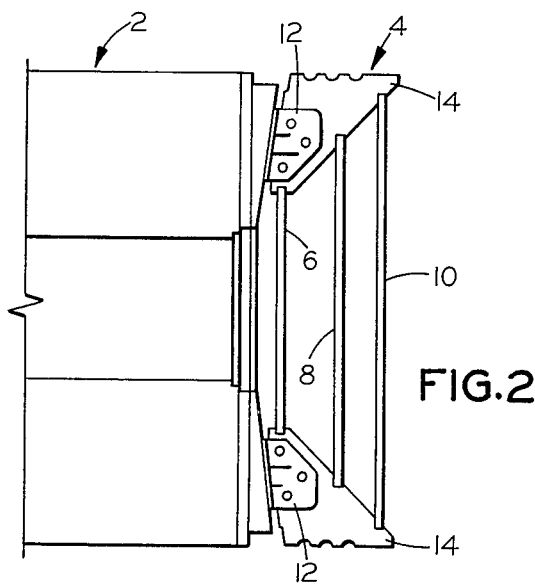
FIG. 2 is a side elevation view of a portion of the dynamoelectric machine taken on the lines 2—2 in FIG. 1.

Referring to the drawings, and more particularly to FIGS. 1 and 2, a dynamoelectric machine 2 is shown provided with a plurality of coil end-turn support assemblies 4 constructed in accordance with this invention. As shown in FIG. 1, twelve of the support assemblies 4 are angularly equally spaced to support the coil end-turns. The assemblies 4 support concentric rings 6, 8 and 10 to which are secured the coil end-turns in a customary manner such as, for instance, by roving.

Figure 3:
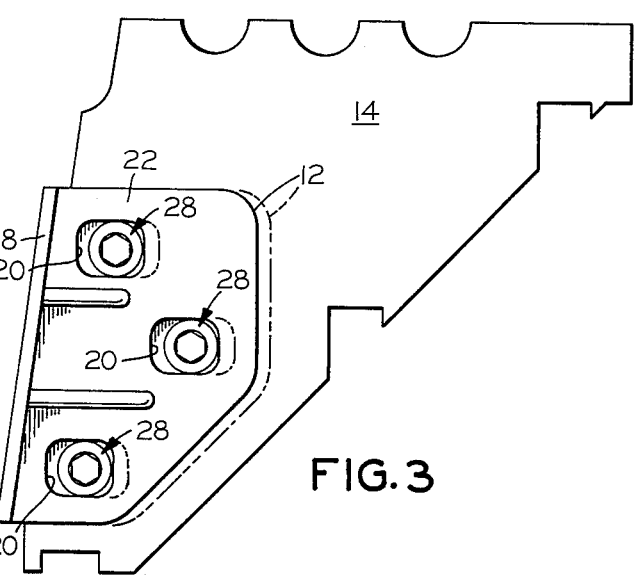
FIG. 3 is an enlarged side elevation view of the support member and bracket shown in FIG. 2.
Figure 4:
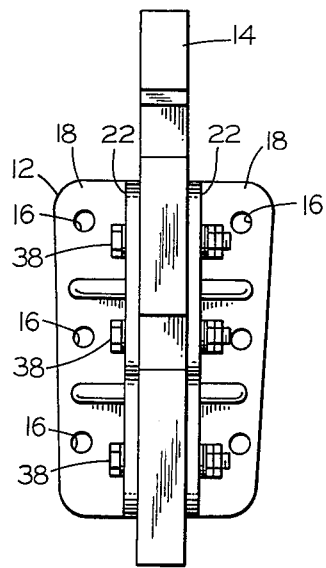
FIG. 4 is an end or axial view of the support member and bracket shown in FIG. 3.
Figure 5:
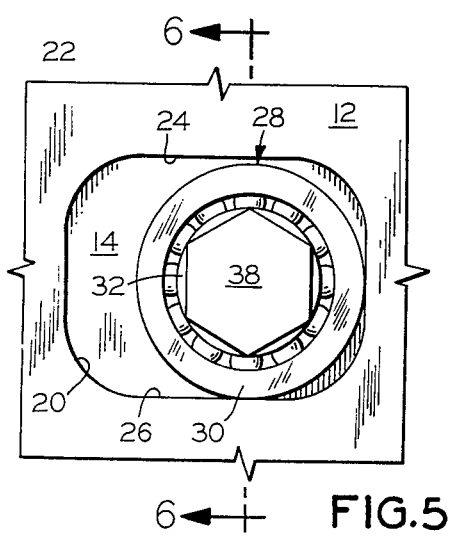
FIG. 5 is an enlarged detailed view of the ball bearing and slot arrangement shown in FIG. 3.

As shown in FIGS. 3 and 4, the support assemblies 4 comprise two L-shaped brackets 12, and a support plate or member 14. The L-shaped brackets 12 are secured to the main body or core of the dynamoelectric machine 2 by fastening means (not shown) passing through the apertures 16 formed in the base portion 18 of the brackets. A plurality of elongated slots 20 are formed in the axially extending portions 22 of the brackets 12. The slots 20 are elongated in the axial direction and are provided with parallel sides 24 and 26 extending in the axial direction. Referring to FIG. 5 a ball bearing assembly 28 which is received within the elongated slot 20 is shown.

The ball bearing assembly 28 includes an outer race 30, inner race 32, and a plurality of balls 34 captured therebetween. It will be noted that the parallel side walls 24 and 26 of the slot 20 are spaced apart a slightly greater distance than the outside diameter of the outer race 30. This spacing permits the ball bearing assembly 28 to roll within the slot 20 in an axial direction with respect to the dynamoelectric machine.

Figure 6:
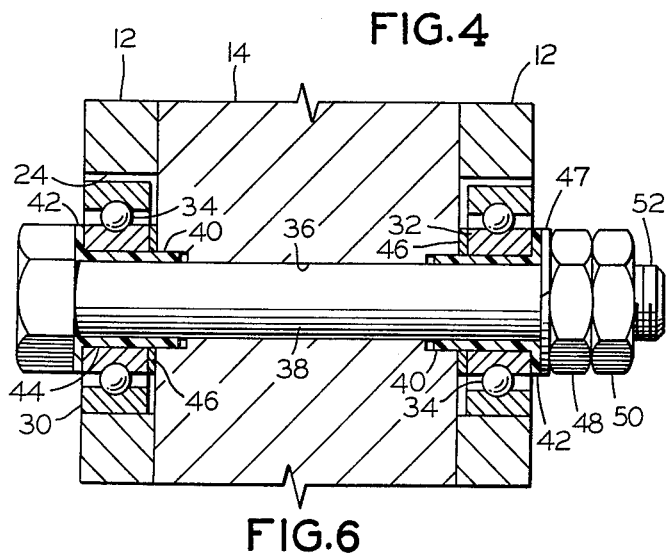
FIG. 6 is a partial cross-sectional view taken along the lines 6—6 in FIG. 5.

As is best seen in FIG. 6 the support plate 14 is provided with an aperture 36 which receives a second portion of cylindrical member or through bolt 38. The first portions of through bolt 38 are secured within the bores of the ball bearings. The aperture 36 has an enlarged diameter 40 at each end to receive a portion of an insulating bushing 42. The inside diameter 44 of the inner race 32 of the ball bearing assembly 28 is made to snugly fit over the outer diameter of the insulating bushing 42. A thin non-magnetic washer 46 is received over the insulating bushing 42 and is placed between the ball bearing assembly 28 and the support plate 14.

After the support plate 14 has been positioned between the brackets 12, and the washers 46, insulated bushings 42, and ball bearing assemblies 28 assembled with the through bolt 38, they are secured by a lockwasher 47 and a pair of nuts 48 and 50 received on the threaded end 52 of the through bolt. This assembly is most clearly shown in the exploded view of FIG. 7.

The winding support bracket is typically formed of an insulating material, so as to provide a part of the insulation between the coil end-turns and the main body of the dynamoelectric machine. The L-shaped brackets 12 may be formed of brass, bronze, stainless steel or any other high strength non-magnetic material which may be readily fabricated in the desired shape. The insulating bushings 42 are provided to prevent circulating currents from being established through the L- shaped brackets 12 and the through bolts 38. The ball bearing assemblies 28 are standard items readily available from industrial sources. The through bolts 38, the washers 46 and the nuts 48 and 50 like L-shaped brackets 12 are formed of a high strength non-magnetic material.

Making reference to FIGS. 8 and 9 the coil end-turn support arrangement of this invention provides positive support for the coil end-turns in every direction except the axial direction. In the case of a radially outwardly directed force as indicated by the arrow 54 in FIG. 8, the resultant forces exerted on the brackets 12 by the ball bearing assemblies 28 are shown by the arrows 56. Similarly, if the coil end-turns exert a resultant inwardly directed radial force as indicated by the arrow 58 in FIG. 9 on the support plate 14, the resultant forces acting on the L-shaped brackets 12 by the ball bearing assemblies 28 are represented by the arrows 60.

In summary, the support assemblies 4 will receive and transmit forces applied in any and all directions except the axial direction, in which direction they allow relatively free movement of the coil end-turns. As illustrated in FIGS. 8 and 9, a force in either the upward or downward direction as viewed in FIG. 2 will result in the outer race of the bearing coming into contact with either the upper or lower surface of the slot and leaving contact with the opposite surface. Such being the case, the ball bearing assemblies 28 are free to rotate in the slots 20 rather than having to slide therein. Thus, there is a resultant lower coefficient of friction as compared to sliding, and the possibilities of the system binding or sticking have been substantially eliminated.

When these support assemblies are used at both ends of a dynamoelectric machine to support the coil end-turns, they are very effective in prolonging the life span of the coils, by reducing stresses, particularly in long machines or machines which are subject to large temperature variations. It has been found that the ball bearings are suitable for much higher force loadings than plastic films or pads such as are used in other systems. It has been further found that the greater the radial loading, i.e., as indicated by the arrows 56 and 60 in FIGS. 8 and 9, the easier the end-turn support plates 14 move axially. The same was not true for other coil end-turn support systems which have been used. Further, the support assemblies of this invention have good wearing characteristics with respect to the 120 hertz vibration that is normally present in large 60 hertz dynamoelectric machines.

It should be apparent to those skilled in the art, that while what has been described is considered at the present to be the preferred embodiment of this invention, in accordance with the Patent Statutes, changes may be made in the disclosed coil end-turn support structure without actually departing from the true spirit and scope of this invention.

What is claimed as new and is desired to be secured as Letters Patent of the United States is:

1. In a dynamoelectric machine having a rotor and a stator, a stator coil end-turn support assembly comprising:
   a. at least one first support member secured to the stator adjacent to the stator coil end-turns;
   b. at least one second support member secured to the stator coil end-turns;
   c. at least one ball bearing assembly, one of said support members having a slot therein elongated in the axial direction of the machine and having a width in the radial direction of the machine between axially extending sidewalls, only slightly greater than the outside diameter of said ball bearing assembly;
   d. a cylindrical member having first and second portions, said first portion being received in the bore of said ball bearing assembly, said other support member being provided with a bore to snugly receive said second portion of said cylindrical member, said bearing assembly engaging one of the sidewalls of said elongated slot and being free to roll in said elongated slot in the axial direction to permit axial movement of the coil end-turns, whereby said stator coil end-turns are supported with freedom to move in the axial direction only.

2. The stator coil end-turn support assembly set forth in claim 1 wherein said second support member is positioned between and is supported by a pair of said first support members.

3. The stator coil end-turn support assembly set forth in claim 2, wherein one of said slots if formed in each of said first support members, and said cylindrical member is snugly received in a bore in said second support member with one of said ball bearing assemblies being received on said cylindrical member on each side of said second support member, and one of said assemblies being positioned within each one of said slots.

4. The stator coil end-turn support arrangement of claim 3 wherein three slots are formed in each of said first support members, three cylindrical members are snugly received in three bores in said second support member, and a pair of said ball bearing assemblies are received on each of said cylindrical members, with one of said ball bearings being positioned within each one of said slots, such that each one of said second support members is supported from a pair of first support members by three pairs of ball bearing assemblies.

5. The stator coil end-turn support arrangement of claim 1 wherein said first support member has a planar portion extending in an axial direction in a radial plane with respect to the rotor and stator, and said second support member extends in an axial direction in a radial plane with respect to the rotor and stator and is positioned adjacent to said planar portion of said first support member.

6. The stator coil end-turn support arrangement of claim 1 wherein said first support member and said cylindrical member are formed of a non-magnetic material and said second support member is formed of an insulating material so as not to provide additional undesirable paths for magnetic flux, and to aid in insulating said stator coil end-turns from said stator.

7. The stator coil end-turn support arrangement of claim 5 wherein a pair of said first support members are mounted on opposite sides of said second support member so as to support said second support members therebetween.

8. The stator coil end-turn support arrangement of claim 6 wherein an insulated bushing is received over said first portion cylindrical member within the bore of said ball bearing to prevent circulating current from flowing between said first support member and said cylindrical member.

* * * * *

UNITED STATES PATENT AND TRADEMARK OFFICE
CERTIFICATE OF CORRECTION

PATENT NO. : 3,974,409
DATED : August 10, 1976
INVENTOR(S) : Robert E. Loy

It is certified that error appears in the above-identified patent and that said Letters Patent are hereby corrected as shown below:

Column 4, line 30, before "assemblies" insert -ball bearing-

Signed and Sealed this

Twenty-fifth Day of January 1977

[SEAL]

Attest:

RUTH C. MASON
*Attesting Officer*

C. MARSHALL DANN
*Commissioner of Patents and Trademarks*